(No Model.)
G. B. PAQUETTE.
AXLE CLAMP FOR SLEIGH ATTACHMENTS FOR VEHICLES.
No. 499,575. Patented June 13, 1893.
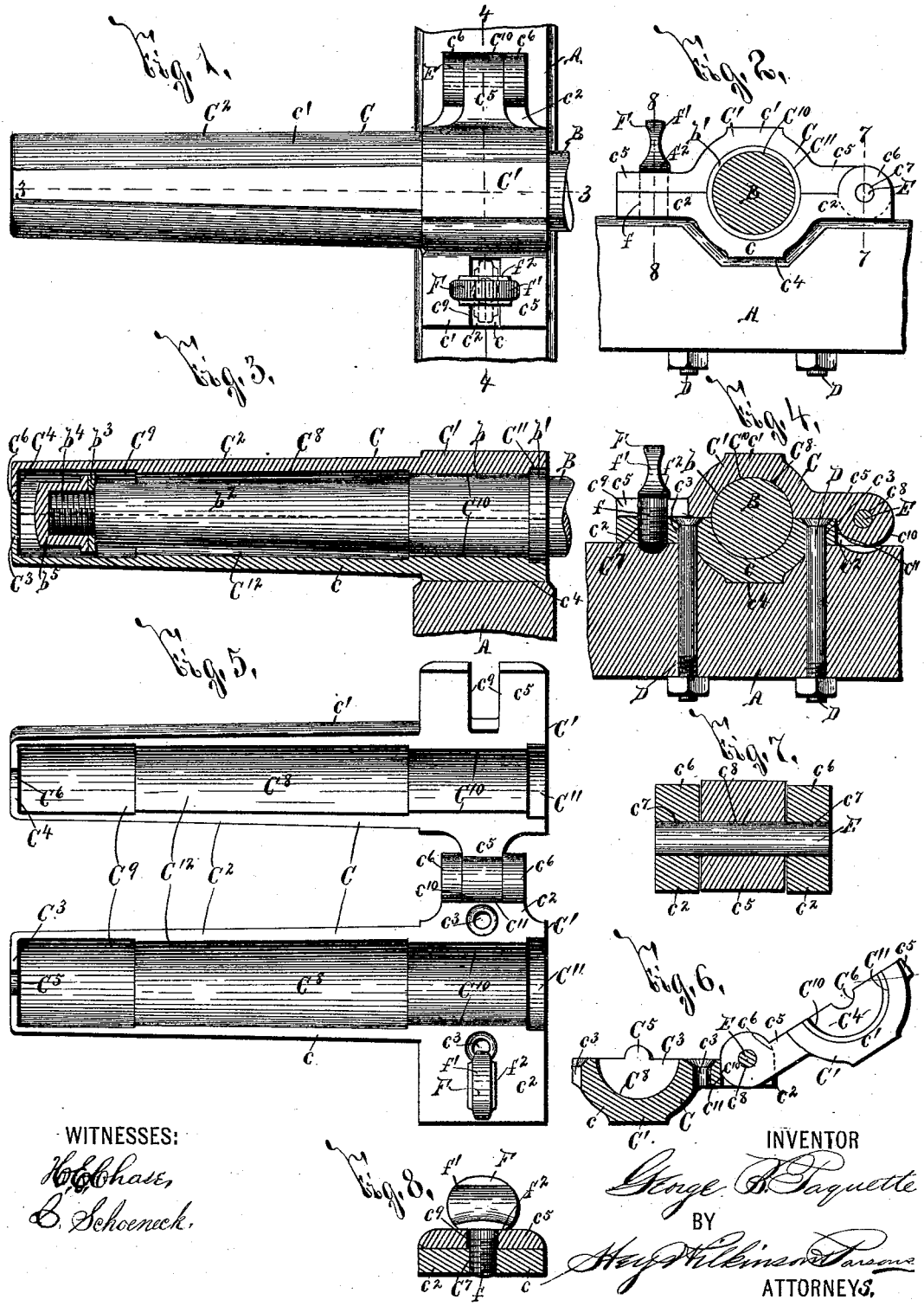
WITNESSES:
INVENTOR
George B. Paquette
BY
Henry Wilkinson Parsons
ATTORNEYS.

UNITED STATES PATENT OFFICE.

GEORGE B. PAQUETTE, OF FULTON, NEW YORK.

AXLE-CLAMP FOR SLEIGH ATTACHMENTS FOR VEHICLES.

SPECIFICATION forming part of Letters Patent No. 499,575, dated June 13, 1893.

Application filed July 11, 1892. Serial No. 439,596. (No model.)

*To all whom it may concern:*

Be it known that I, GEORGE B. PAQUETTE, of Fulton, in the county of Oswego, in the State of New York, have invented new and useful Improvements in Axle-Clamps, of which the following, taken in connection with the accompanying drawings, is a full, clear, and exact description.

My invention relates to improvements in axle supporting boxes particularly applicable for use upon sleighs and similar devices, and has for its object the production of a simple and effective device for securely holding the axle in position and protecting the same from injury or exposure to the elements; and to this end it consists, essentially, in a bottom box section adapted to be rigidly secured to the sleigh frame formed with a head and a projecting end having an upturned end wall at the outside of the axle, a top box section hinged to the bottom section and formed with a head, a projecting end piece and an end wall corresponding to the like parts of the former section, a clamp for securing the top section in position, and in the detail construction and arrangement of the parts, all as hereinafter more particularly described and pointed out in the claims.

In describing this invention, reference is had to the accompanying drawings, forming a part of this specification, in which like letters indicate corresponding parts in all the views.

Figure 1 is a top plan view of my improved box shown as operatively mounted upon a portion of a sleigh frame and as engaged with one end of an axle. Fig. 2 is a side elevation of the parts as shown at Fig. 1. Fig. 3 is a longitudinal vertical sectional view, taken on line —3—3—, Fig. 1. Fig. 4 is a transverse sectional view, taken on line —4—4—, Fig. 1. Fig. 5 is a top plan view of my detached box shown as in its open position. Fig. 6 is a transverse vertical sectional view, partly in elevation, of the parts of my box as in their positions shown at Fig. 5, the free ends of the upper and lower sections being broken away. Fig. 7 is a detail vertical sectional view, taken on line —7—7—, Fig. 2, and Fig. 8 is a detail sectional view, taken on line —8—8—, Fig. 2.

It is frequently desirable at certain seasons of the year to remove the wheels from hacks and other vehicles and to place the same upon sleighs to facilitate their movement over snow, ice, &c., and my invention has for its object the production of a simple, practical, and efficient device adapted to be secured to the sleighs for engaging and supporting the axles of the vehicle.

—A— represents a portion of the frame of a sleigh, and, as the sleigh frame may be of any desired form, size, and construction to support the vehicle adapted to be mounted thereon, it is unnecessary to herein further illustrate or describe said frame.

—B— is one end of the axle of a vehicle adapted to be supported upon the sleigh frame —A—, and, as the axle may also be of any desirable form, size, and construction, I have here illustrated only its detached outer end. This end of the axle is formed with the usual inner cylindrical bearing face —$b$—, the annular flange or shoulder —$b'$—, the tapering outer end —$b^2$— for supporting the hub of a wheel, not illustrated, a washer —$b^3$— a screw threaded spindle —$b^4$—, and a nut —$b^5$—.

—C— represents my improved box, which is preferably composed of a lower section —$c$— and an upper section —$c'$—, and is formed with an inner head —C'— and a tapering outer end —$C^2$—. The section —$c$— is formed with outwardly extending lugs —$c^2$—$c^2$— having vertical openings or perforations —$c^3$—$c^3$— through which pass bolts —D—D— extending through the frame —A— for rigidly and firmly securing said section in position. The frame —A— is also formed with a depressed curved seat —$c^4$— for receiving the convex portion of the head —C'— interposed between the lugs —$c^2$—$c^2$—. The head —C'— of the top section —$c'$— is formed with lugs —$c^5$—$c^5$— arranged directly above the corresponding lugs —$c^2$—$c^2$— of the lower section —$c$—. The rear lug —$c^5$— is of less width than the corresponding lug —$c^2$—, and on opposite sides of the lug or ear —$c^5$— are upturned ears —$c^6$— formed integral with said lug —$c^2$—.

—E— is a pivot passed through openings —$c^7$—$c^7$—, —$c^8$— in the ears —$c^6$—$c^6$— and the lug —$c^5$— for pivoting the top section —$c'$— of my improved box to the lower section —$c$—. The rear lug —$c^2$— is preferably bifurcated, and the lug —$c^5$— swings in the bifurcation, thus greatly reducing the height of the pivot —E— above the under face of the lug —$c^2$— and adding to the appearance and practicability of my invention.

The box —C— is preferably formed at the outer extremity of its end —$C^2$— with an end wall consisting of an upturned wall —$C^3$— arranged on the outside of the extreme end of the axle —B—, and formed upon the lower section —$c$— and a depending wall or shoulder —$C^4$— aligned with the wall —$C^3$— and formed upon the outer end of the upper box section. Upon the edge of one of these walls as the lower one —$C^3$— is a nipple or projection —$C^5$— adapted to engage a corresponding groove —$C^6$— in the adjacent edge of the other wall —$C^4$— for securing together the outer ends of the box sections and preventing one from shifting laterally upon the other.

—F— is a clamp or fastening device for securing the top box section —$c'$— in operative position. As preferably constructed this clamp consists of a screw having a threaded shank —$f$— movably mounted in a threaded socket —$C^7$— in the forward ear —$c^2$— and having a head —$f'$— of greater length than thickness provided with lower bearing shoulders —$f^2$—.

—$c^9$— is a slot in the front lug —$c^5$— of the top box section —$c'$—, and, as preferably constructed, this slot opens inwardly from the front edge of said lug, and is formed of greater length than width, and of sufficient width to permit the passage therethrough of the clamp head —$f'$— when forced to its position shown by dotted lines at Fig. 1 and full lines at Fig. 5.

My improved box is formed with an inner chamber —$C^8$— having an annular groove —$C^9$— at its outer end and its inner periphery is formed by corresponding concave surfaces in the upper and lower faces of the lower and top box sections —$c$—$c'$—. As preferably constructed the inner end of the internal chamber —$C^8$— is formed with the raised peripheral surface —$C^{10}$— for forming the same of less diameter than its outer end for firmly engaging and supporting the cylindrical face —$b$— of the axle. In the outer extremity of this surface —$C^{10}$— is an annular groove —$C^{11}$— formed partly in the upper and partly in the lower section for receiving the shoulder —$b'$— upon the axle —B— and preventing lengthwise movement of the same within the box. The outer portion —$C^{12}$— of the chamber —$C^8$— of the box —C— is somewhat tapering, and is formed of greater diameter at its outer end by the groove —$C^9$—. This outer portion of the chamber —$C^8$— is of sufficient diameter to receive the end —$b^2$— of the axle —B— even when the washer —$b^3$— and the nut —$b^5$— are in operative position thereon. It will now be apparent that the groove —$C^9$— is formed in the wall of the chamber —$C^{12}$— in order to increase its diameter at the portion thereof for receiving the part of the axle provided with said washer —$b^3$— and nut —$b^5$—. By engaging only the cylindrical portion —$b$— of the axle by the corresponding inner surface —$C^{10}$— of the box —C—, I secure the axle more firmly and positively than if the same were engaged by the entire inner wall of the box —C—.

When desired to remove a vehicle body from a set of wheels to a sleigh the nuts and washers for securing the wheels in position are removed, the wheels are withdrawn from the axles, and the nuts and washers are then replaced. The clamp —F— is forced to its position, shown at Fig. 5, the top box section —$c'$— is swung backwardly to its open position, as shown at Fig. 5, the ends of the axles with the washers and nuts thereon are placed upon the lower box sections —$c$—, the upper sections —$c'$— are swung to the normal position, and the clamps —F— are screwed to the operative position. The top box section —$c'$— when swung backwardly, as shown at Fig. 5, is supported by a cam face —$c^{10}$— on the ear —$c^5$— which engages with the face —$c^{11}$— of the adjacent ear —$c^2$— of the lower box section.

It will be particularly noted that the box —C— is of sufficient length to entirely incase the outer end of the axle, and is provided with end walls —$C^3$—$C^4$— for closing its outer end. By this means I entirely prevent foreign articles, as passing vehicles, stationary posts, walls, and stones from engaging and injuring the portion of the axle projecting beyond the sleigh frame —A—. Moreover, I entirely protect the axle from the influence of the elements, and, if desired, the box —C— may be filled with grease or other suitable material for preventing wear or oxidation of the axle.

The parts of my invention are simple in construction, and may be readily cast, forged, or otherwise brought to the desired form, are readily secured in position, and are durable, effective, and practical in operation and use.

As the detail construction and arrangement of the parts of my axle supporting box may be somewhat varied from that shown and described without departing from the spirit of my invention, I do not herein limit myself to such exact form and construction.

Having thus fully described my invention, what I claim as new, and desire to secure by Letters Patent, is—

1. The combination with an axle and the frame of a sleigh or similar support; of a box formed with an outer end wall at the outside of the end of the axle and composed of a section rigidly secured to the frame, and a second box section hinged to the former section, and a clamp having one end engaged with the former section and the other end removably engaged with the other section, substantially as described.

2. The combination with an axle and the frame of a sleigh or similar support; of a box formed with one end open and the other end closed and composed of two sections, a fastening device for securing one section to the frame, and a movable clamp for securing the latter section to the former section, substantially as specified.

3. The combination with an axle and the frame of a sleigh or similar support; of a box section rigidly secured to the frame and formed with an end wall at the outside of the end of the axle, a second box section hinged to the former section and formed with an end wall also at the outside of the end of the axle, and a clamp for securing the latter section in its operative position, substantially as set forth.

4. The combination with an axle and the frame of a sleigh or similar support; of a box section rigidly secured to the frame and formed with an end wall at the outside of the axle provided with a projection, a second box section hinged to the former section and formed with an end wall also at the outside of the axle provided with a groove for registering with the projection in the former end wall, and a clamp for securing said sections together, substantially as and for the purpose set forth.

5. The combination with an axle and the frame of a sleigh or similar support; of a box section rigidly secured to the frame and formed with projecting ears, a second box section formed with an ear hinged to the former ears, and a screw having its shank mounted in the former section and its head adapted to removably engage the latter section, substantially as and for the purpose described.

6. The combination with an axle and the frame of a sleigh or similar support; of a box section rigidly secured to the frame and formed with a socket, a second box section hinged to the former section and formed with a slot of greater length than width, a clamp consisting of a shank mounted in the socket of the former section and a head of greater length than thickness adapted to pass through said slot or to engage the upper section on opposite sides of the slot, substantially as specified.

7. The combination with an axle and the frame of a sleigh or similar support; of a box section rigidly secured to the frame and formed with an end wall at the outside of the end of the axle and with projecting ears, a second box section formed with an end wall also at the outside of the end of the axle and formed with a projecting ear hinged to the former ears, and a clamp for securing the latter section in its operative position, substantially as specified.

8. The combination with an axle and the frame of a sleigh or similar support; of a box section rigidly secured to the frame and formed with an end wall at the outside of the end of the axle and with a socket, a second box section hinged to the former and formed with an end wall also at the outside of the end of the axle and with a slot of greater length than width, a clamp consisting of a shank secured to the former section and a head of greater length than thickness adapted to pass through said slot or to engage the upper section on opposite sides of the slot, substantially as described.

9. The combination with an axle and the frame of a sleigh or similar support; of a box section rigidly secured to the frame and formed with projecting ears and with a socket, a second box section formed with an ear hinged to the former ears and with a slot of greater length than width, a clamp consisting of a shank mounted in said socket and a head of greater length than thickness adapted to pass through said slot or to engage the upper section on opposite sides of the slot, substantially as specified.

10. The combination with an axle and the frame of a sleigh or similar support; of the lower section of a box rigidly secured to the frame and formed with an open inner end and an outer end wall and with a raised bearing face on the upper wall of its inner end for engaging the axle, a lug extending laterally from said box section provided with a screw threaded socket, a top box section formed with an end wall and with a projecting bearing face on the lower wall of its inner end for engaging the axle, a lug extending laterally from this latter box section provided with a slot of greater length than width, a clamp consisting of a shank movably mounted in said socket, and a head of greater length than thickness adapted to pass through said slot or to engage the upper section on opposite sides of the slot, substantially as specified.

11. The combination with an axle having a cylindrical bearing face —$b$— and a shoulder —$b'$— on the inner side of said face; of the frame of a sleigh or similar support, a box formed with an end wall at the outside of the end of the axle, and composed of the section —$c$— rigidly secured to the frame, and the section —$c'$— hinged to the former section, said box being provided with an interior chamber —$C^8$— having its outer end of greater diameter than the portion of the axle incased thereby and formed with a raised bearing surface —$C^{10}$— for engaging the axle surface —$b$— and with an annular groove —$C^{11}$— at the inner side of the surface —$C^{10}$— for receiving the shoulder —$b'$— on the axle, and a clamp —F— for securing the section —$c'$— in its operative position, substantially as and for the purpose set forth.

In testimony whereof I have hereunto signed my name, in the presence of two attesting witnesses, at Fulton, in the county of Oswego, in the State of New York, this 30th day of June, 1892.

GEORGE B. PAQUETTE.

Witnesses:
SOLON F. CASE,
GEO. KELLOGG.